UNITED STATES PATENT OFFICE.

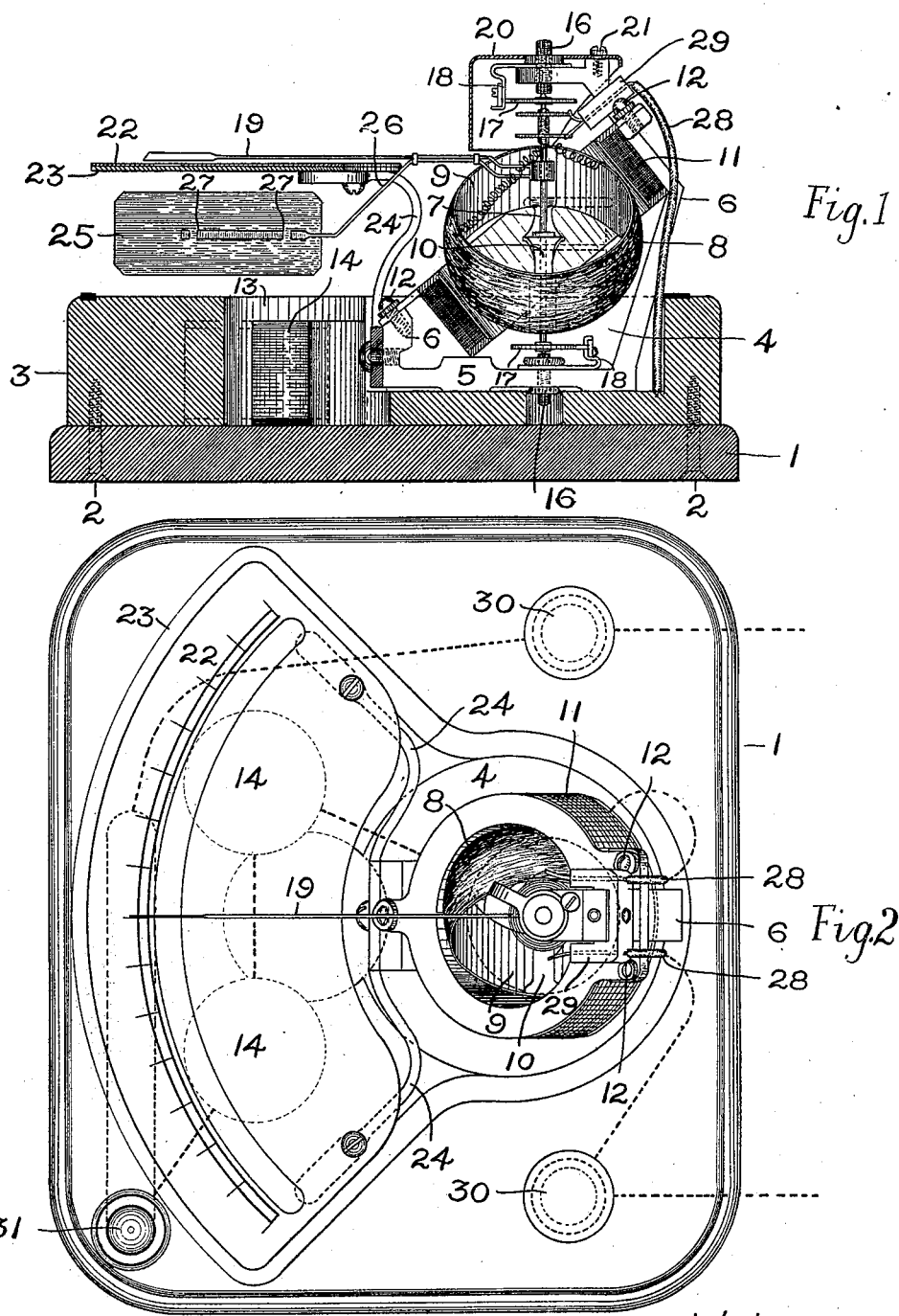

ELIHU THOMSON, OF SWAMPSCOTT, MASSACHUSETTS, ASSIGNOR TO THE GENERAL ELECTRIC COMPANY, OF NEW YORK.

ELECTRIC MEASURING INSTRUMENT.

SPECIFICATION forming part of Letters Patent No. 590,654, dated September 28, 1897.

Application filed June 17, 1897. Serial No. 641,097. (No model.)

*To all whom it may concern:*

Be it known that I, ELIHU THOMSON, a citizen of the United States, residing at Swampscott, in the county of Essex, State of Massachusetts, have invented certain new and useful Improvements in Electric Measuring Instruments, (Case No. 567,) of which the following is a specification.

This invention relates to voltmeters and involves in its construction a fixed coil located at an angle and a movable coil located within the fixed coil at an angle thereto, such arrangement being set forth in United States Letters Patent No. 554,321, granted me February 11, 1896. In the invention set forth in said Letters Patent the movable coil is connected in shunt with the fixed coil, so that the instrument forms a watt-indicator.

In the present invention the two coils are in series with each other and with a resistance, and the instrument is designed for a voltmeter.

The construction is hereinafter set forth and claimed.

Referring to the accompanying drawings, Figure 1 is a view in elevation of a voltmeter constructed in accordance with this invention. Fig. 2 is a plan view thereof.

1 indicates the base of the instrument, of insulating material. To the base 1 is secured by screws 2 or other suitable means the main frame 3 of the instrument. In a suitable recess 4 in the main frame 3 is mounted a metallic frame 5, having the arms or brackets 6. Mounted in the frame 5 and in one of the brackets 6 is a vertical rotary shaft 7, on which is mounted at an angle thereto the movable coil 8. The movable coil is supported by a mica ring 9, secured to a bent strip 10 of aluminium fastened to the shaft 7. Mounted at an angle to and inclosing the movable coil 8 is the fixed coil 11, secured by screws 12 to the brackets 6. Mounted in a suitable recess 13 in the main frame 3 are resistance-spools 14, wound with a high-resistance wire having a negligible temperature coefficient, such as manganese or German silver. The coils 8 and 11 are wound with copper wire, and the external resistance being of manganese any substantial heating effect is thereby removed from the coils 8 and 11.

The coils 8 and 11 are connected in series with the resistance 14 and with each other. The ends of the shaft 7 are supported in adjustable bearings 16. Spiral springs 17, mounted on the upper and lower ends of shaft 7 and connected to brackets 18 on frame 5 and upper bracket 6, tend to bring the index 19 on shaft 7 to zero.

20 is the cap or cover for the upper end of shaft 7, secured to upper bracket 6 by screw 21.

The scale 22 is mounted on a support 23, secured to brackets 24, fastened to frame 5. Beneath the support 23 is located the damper 25, consisting of a thin aluminium sheet fastened to an aluminium wire 26, branching from the rear part of the index 19 and secured thereto and to the shaft 7.

The damper 25 may be secured to the wire 26 in any suitable way, and, as here shown, by passing the outer end of the wire in and out of slits or openings 27 in the sheet 26 and compressing the parts together.

28 are the leads to the movable coil 8, flexibly connected thereto and supported by a fiber insulation 29, as shown.

30 30 are posts connected to an outside circuit, the leads 28 being connected to said posts.

31 indicates the switch.

The connections to the circuit and through the coils and resistance are clearly indicated by dotted lines.

I claim—

1. In an electrical measuring instrument, a coil mounted at an angle on a shaft, a second coil mounted at an angle to the first coil and its shaft and encircling the same, the said coil being in series with the first coil, an indicator and scale for reading the movements of the shaft and movable coil, and means for returning the instrument to zero and opposing the movements of the movable coil under the action of the current in said coils.

2. In an electrical measuring instrument, a coil mounted at an angle on a shaft, a second coil mounted at an angle to the first coil and its shaft and encircling the same, the said coil being in series with the first coil, a high resistance in series with said coils, an indicator and scale for reading the movements of the shaft and movable coil, and means for returning the instrument to zero, and opposing the movements of the movable coil under the action of the current in said coils.

3. In an electrical measuring instrument, a coil mounted at an angle on a shaft, a second coil mounted at an angle to the first coil and its shaft and encircling the same, the said coil being in series with the first coil, a high resistance in series with said coils, an indicator and scale for reading the movements of the shaft and movable coil, a damper and means for returning the instrument to zero and opposing the movements of the movable coil under the action of the current in said coils.

In witness whereof I have hereunto set my hand this 14th day of June, 1897.

ELIHU THOMSON.

Witnesses:
   JOHN W. GIBBONEY,
   RAYMOND H. DANFORTH.